__United States Patent__ [19]

Ceccacci

[11] Patent Number: 4,599,783

[45] Date of Patent: Jul. 15, 1986

[54] PROCESS FOR THE CONSTRUCTION OF A COMPOSITE TUBE COMPRISING A METAL TUBE, IN PARTICULAR A COPPER TUBE, AND A CLADDING OF DEFORMABLE FOAM MATERIAL

[75] Inventor: Pier B. Ceccacci, Florence, Italy

[73] Assignee: Tubi Italia S.p.A., Florence, Italy

[21] Appl. No.: 625,557

[22] Filed: Jun. 28, 1984

[30] Foreign Application Priority Data

Dec. 19, 1983 [IT] Italy ................. 68318 A/83

[51] Int. Cl.⁴ .............. B23P 11/02; B23P 19/02; B23P 17/00
[52] U.S. Cl. ........................ 29/450; 29/235; 29/421 R
[58] Field of Search .......... 29/235, 450, 421 R; 72/54, 61

[56] References Cited

U.S. PATENT DOCUMENTS 3,611,536 10/1971 Guenther et al. .............. 29/235
4,199,851 4/1980 Doherty ........................ 29/235

Primary Examiner—Howard N. Goldberg
Assistant Examiner—Steven Nichols
Attorney, Agent, or Firm—Shlesinger, Arkwright, Garvey & Fado

[57] ABSTRACT

A process is provided for the construction of a composite tube comprising a metal tube, in particular a tube of copper, and a cladding of tubular form into which the said tube is inserted, the material of the said cladding being constituted by a deformable foam material, in particular foam rubber, characterized by the fact that it comprises at least a first phase in which a section of said cladding of predetermined length is disposed in a configuration with its axis substantially rectilinear, a second phase in which a fluid under pressure is fed from a first end of the said cladding to the interior thereof, while at the other end there is introduced one end of the said tube in such a way as to cause, by the action of the said fluid under pressure, a radial deformation of the said cladding, and a third phase in which the said copper tube is introduced axially into the interior of the said cladding while it is deformed radially.

12 Claims, 3 Drawing Figures

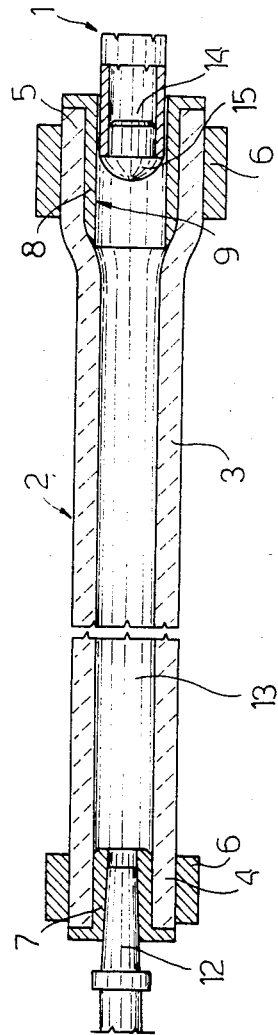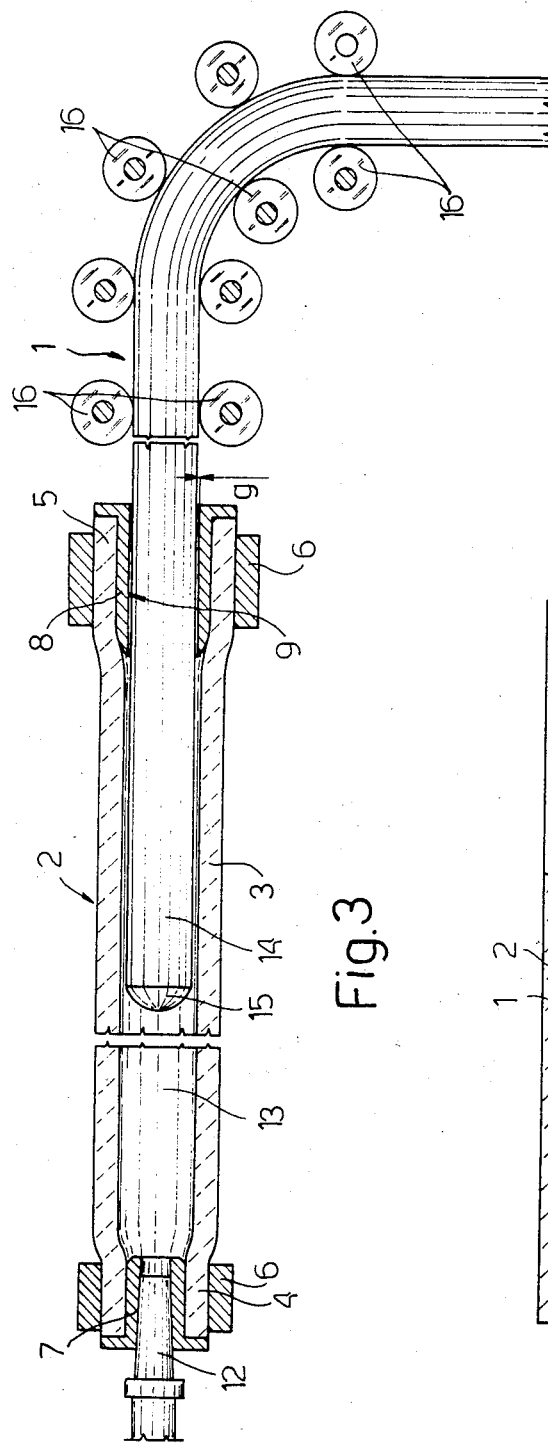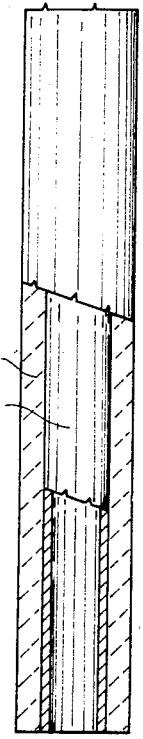

PROCESS FOR THE CONSTRUCTION OF A COMPOSITE TUBE COMPRISING A METAL TUBE, IN PARTICULAR A COPPER TUBE, AND A CLADDING OF DEFORMABLE FOAM MATERIAL

BACKGROUND OF THE INVENTION

The present invention relates to a process for the construction of a composite tube, comprising a metal tube, in particular a tube of copper, and a cladding of tubular form into which the tube itself is inserted. The said cladding material is deformable foam material, in particular foam rubber. The composite tube obtained with the process of the invention is particularly suitable for use in plumbing systems requiring a thermal insulation sufficient to impede the dispersion of thermal energy to the environment in which the composite tube is disposed.

As is known, in plumbing installations there is very often required a thermal insulation of the tubes through which hot fluids traverse, for the purpose of preventing the dispersion of energy into the external environment.

At present, in order to obtain such insulation, pieces of cladding material of tubular form are normally used. The pieces are cut substantially along a generatrix, subsequently opened and fitted around the metal tube to be insulated, so that they adhere tightly thereto.

The said pieces are provided by cutting from cladding of tubular form and greater length. The claddings are normally made from a synthetic foam material, usually foam rubber, and therefore have a significant quantity of closed cells, or cells in communication with one another, so as to provide a good thermal insulation. The said tubular cladding is normally obtained by means of a process which comprises an extrusion phase and subsequent thermal treatments during which the cladding itself is subjected to numerous operations which must necessarily be performed after the extrusion operation itself, and which operations require rather a long time.

Composite tubes are also known, for example copper tubes which have an outer cladding of a thermo-plastic material, normally polyvynyl chloride, which is extruded directly onto the tube. Although these tubes are provided with an outer cladding they do not, however, have a sufficiently high thermal insulation to prevent transmission of thermal energy towards the external environment, and therefore they are not suitable for the majority of applications in plumbing installations.

SUMMARY OF THE INVENTION

The object of the present invention is to provide a process for the construction of a composite tube, even one having a very great length (for example several hundreds of meters) comprising a metal tube, in particular copper tube, and a cladding of tubular form into which the said tube is inserted. The cladding is constituted by a deformable foam material, in particular foam rubber. With this process it is therefore possible to obtain a composite tube which has very high thermal insulation characteristics and is therefore suitable for use in plumbing systems in which it is desired to avoid substantial transmission of thermal energy towards the external environment. With the tubes produced by the process of the invention the steps currently followed to obtain insulation of tubes are no longer necessary. The deleted steps include, as mentioned, cutting pieces of cladding of tubular form, opening them by cutting substantially along a generatrix, and in fitting them manually onto various sections of metal tube. The tubing obtained with the process of the invention avoids the long and expensive manual operations which significantly affect the overall cost for preparation of the system.

According to the present invention, therefore, there is provided a process for the construction of a composite tube, comprising a metal tube, in particular a copper tube, and a cladding of tubular form into which the said tube is inserted. The material of the cladding being a deformable foam material, in particular foam rubber. The process comprises at least a first phase in which a section of predetermined length of the cladding is disposed in a configuration with its axis substantially rectilinear, a second phase in which a fluid under pressure is introduced to the interior of the cladding from a first end thereof whilst into the other end there is introduced one end of the said tube. In this way, by the action of the fluid under pressure, a radial deformation of the cladding occurs. In a third phase, the copper tube is introduced axially into the interior of the cladding whilst the cladding is radially deformed.

BRIEF DESCRIPTION OF THE DRAWINGS

For a better understanding of the process of the present invention a description of the principal phases will now be given, with reference to the attached drawings, in which:

FIG. 1 represents a section of composite tube obtained by the process of the invention;

FIG. 2 illustrates a basic part of the equipment utilised to perform the process, a section of tubular cladding and a section of metal tube which is to be inserted into the interior thereof, at the end of the first phase of the process; and FIG. 3 illustrates the equipment of the preceding Figure during the third phase of the process.

DETAILED DESCRIPTION OF THE INVENTION

The process of the invention is adapted for the production of a composite tube of the type illustrated in FIG. 1. The composite tube comprises and inner metal tube 1, for example a copper tube, and an external cladding 2 of tubular form constituted by a resilient foam, conveniently foam rubber. The cladding is of the type comprising a plurality of closed cells or cells communicating with one another. The cladding has a radial thickness sufficient to guarantee a perfect thermal insulation of the copper tube disposed within the interior thereof in such a way as substantially to avoid dispersions of thermal energy to the environment in which the composite tube is used.

In the composite tube of the invention the connection between the inner tube 1 and the cladding 2 is effected in such a way as to prevent any accidental displacement of the cladding itself from the tube, even when only short sections of composite tube are used. The connection between the cladding and the tube occurs because high pressures caused by forces which are transmitted between the inner surface of the cladding and the outer surface of the tube.

In a first phase of the process, a section 3 of cladding of predetermined length, for example 50 m. is disposed in a configuration with its axis substantially rectilinear, as has been shown in FIG. 2, and the ends 4 and 5 of the section are fixed by means of suitable locking rings 6. Before performing this locking operation, to the interior of the end 4 there is introduced a bushing 7 which maintains the section 3 of cladding substantially undeformed when it is clamped to the associated locking ring 6. Into the other end 5 there is inserted a second bush 8 which, as well as performing the same action as that of the bush 7, also serves to radially enlarge the end itself by a predetermined amount. For purposes which will be indicated, the diameter of the cylindrical inner surface 9 of the bush 8 is slightly greater than that of the outer surface of the metal tube 1 which is to be introduced into the section of cladding.

In the second phase of the process, and outlet 12 is introduced into the hole in the bush 7. Outlet 12 is in communication with a suitable source of fluid under pressure, for example compressed air. The supply of fluid to the interior of the cylindrical cavity 13 of the section 3 of cladding is controlled, thereby causing a radial deformation because of the pressure of the fluid itself as has been shown in FIG. 3. In this way the diameter of the cylindrical cavity 13 is increased, making it assume a predetermined dimension. Preferably, the pressure of the fluid supplied through the outlet 12 is chosen in such a way as to make the inner surface of the foam section 3 assume, in the deformed configuration shown in FIG. 3, a diameter slightly greater than the external diameter of the section 1 of tube which is to be introduced into it.

In the subsequent phase of the process, the metal tube 1, provided at its end 14 with a cap 15 which can be inserted into the interior thereof substantially to close and seal the internal cavity of the tube itself, is introduced in any convenient manner to the interior of the cavity 13 of the section 3 of cladding, as has been shown in FIG. 3. Obviously, this introduction takes place very easily because of the radial play 9 or gap present between the tube and cladding. The introduction can be controlled by means of a series of supply rollers 16 which thrust the tube into the interior of the cladding, drawing it off from a reel not illustrated.

The operation of introduction of the tube into the cladding can be facilitated if, during the first part of the operation of inflation with air being introduced into the interior of the cavity 13, the air carries in suspension a suitable lubrication means, for example a solid lubricant such as talcum powder or the like.

At the end of the said phase of introduction of the tube into the cladding, supply of fluid under pressure through the outlet 12 is stopped. This causes the resilient return of the cladding, which then fits tightly over the outer surface of the tube 1 exerting and exerts a rather high radial pressure on this. At this point, the tube 1, thus inserted into the cladding, is cut from the remaining part and the portion. The section of composite tube thus obtained is discharged from the equipment which is therefore again in the initial condition for production of an additional section of composite tube.

During the phase of introduction of the tube to the interior of the section 13 of cladding, the fluid which enters into the interior of the cavity 13 is discharged out through the radial play, or gap present between the outer surface of the tube 1 and the inner surface 9 of the bush 8. This play or gap which has been indicated with g in FIG. 3, is chosen so as to be sufficient to allow an adequate discharge of the fluid and to ensure a sufficiently high pressure within the interior of the cavity 13 to radially deform the cladding itself by a predetermined amount.

It will be apparent that the process of the invention permits a composite tube, in particular a composite tube having a very great length, even several hundreds of meters, to be obtained in a very simple and rapid manner. The process requires only equipment which can be easily and readily provided. The connection between the cladding and the metal tube is very good because of the high pressure and force between the cladding the tube, therefore it can be utilised even in sections of very short length without risk of axial displacement occuring between the cladding and the tube.

It is further apparent that the various phases of the process of the present invention, which have been described, can be modified and varied without departing from the scope of the invention itself.

I claim:

1. The method of constructing a composite insulated tube, comprising the steps of:
   (a) providing a length of apertured deformable tubular cladding having first and second ends;
   (b) inserting fluid supply means into said first end;
   (c) inserting an apertured bushing into said second end, said bushing having a diameter exceeding the internal diameter of said cladding and thereby enlarging the diameter of said cladding aperture at said second end;
   (d) clamping said first end about said fluid supply means and said second end about said bushing so that the axis of said cladding is rectilinear;
   (e) introducing a closed end of a tube into said bushing aperture and thereby substantially sealing said bushing aperture;
   (f) introducting pressurized fluid through said fluid supply means to said cladding aperture and thereby radially expanding said cladding;
   (g) advancing said closed end through said cladding; and,
   (h) evacuating the fluid from said cladding and thereby causing said cladding to radially contract about said tube.

2. The method of claim 1, including the step of:
   (a) advancing said closed end through said cladding to said fluid supply means.

3. The method of claim 1, including the steps of:
   (a) providing a bushing for said second end having an aperture with a diameter exceeding the diameter of said tube and therewith providing a gap with said tube;
   (b) ceasing the introduction of said fluid; and,
   (c) evacuating said fluid through said gap.

4. The method of claim 1, including the steps of:
   (a) unclamping said first and second ends;
   (b) removing said fluid supply means and said bushing; and,
   (c) cutting said clad tube from the remaining portion of said tube.

5. The method of claim 1, including the step of:
   (a) providing a lubricant in suspension with said fluid for facilitating movement of said tube in said cladding aperture.

6. The method of claim 1, including the step of:
   (a) providing air as said fluid.

7. The method of claim 1, including the steps of:
   (a) closing said end of said tube with a removable cap; and,
   (b) removing said cap after evacuation of said fluid.

8. The method of providing insulated copper tube, comprising the steps of:
  (a) providing a length of apertured tubular foam rubber having first and second ends;
  (b) inserting a first apertured bushing into said first end, said first bushing having an external diameter corresponding to the diameter of said rubber aperture;
  (c) inserting a second apertured bushing into said second end, said second bushing having an external diameter exceeding the diameter of said rubber aperture and thereby enlarging said rubber aperture at said second end;
  (d) inserting fluid supply means into said first bushing aperture;
  (e) longitudinally spacing said bushings so that the axis of said rubber is rectilinear;
  (f) clamping said rubber at said ends to the respective bushings whereby the bushings prevent deformation of the encircling aperture;
  (g) providing a length of copper tube having an external diameter slightly less than the diameter of said second bushing aperture;
  (h) capping an end of said tube;
  (i) inserting said capped end into said second bushing aperture and thereby providing a gap between said second bushing and said tube so that said second bushing aperture is substantially sealed and thereby provides a cavity in said rubber;
  (j) introducing pressurized fluid into said cavity through said fluid supply means and thereby causing said rubber between said bushings to radially expand so that the diameter of said rubber aperture therebetween is increased and exceeds the diameter of said tube;
  (k) feeding said capped end through said rubber to said first bushing;
  (l) ceasing introduction of said fluid to said cavity;
  (m) exhausting said fluid in said cavity through said gap so that said rubber between said bushings radially contracts about and is clad to said tube;
  (n) severing said tube at said second bushing; and,
  (o) unclamping said ends.

9. The method of claim 8, including the step of:
  (a) uncapping said tube.

10. The method of claim 8, including the step of:
  (a) removing said bushings from said ends.

11. The method of claim 8, wherein said introduction of pressurized fluid includes the introduction of pressurized air.

12. The method of claim 8, including the step of:
  (a) introducing pressurized fluid having in suspension a lubricant into said cavity.

* * * * *